(12) United States Patent
Meleshchuk (10) Patent No.: US 7,421,700 B2
(45) Date of Patent: Sep. 2, 2008

(54) INTERPROCESS BUFFER MANAGEMENT USING A BUFFER DELAY TIME

(75) Inventor: Sergei Meleshchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 10/801,929

(22) Filed: Mar. 15, 2004

(65) Prior Publication Data

US 2005/0204360 A1   Sep. 15, 2005

(51) Int. Cl.
G06F 3/00 (2006.01)
G06F 9/46 (2006.01)
G06F 12/00 (2006.01)
G06F 1/04 (2006.01)

(52) U.S. Cl. .................. 719/313; 718/102; 719/312; 710/52; 711/167; 713/375

(58) Field of Classification Search .............. 711/167; 710/52, 57–60; 719/312, 313; 709/232–234; 713/375, 400, 401
See application file for complete search history.

(56) References Cited

U.S. PATENT DOCUMENTS

| | | | |
|---|---|---|---|
| 5,623,483 A * | 4/1997 | Agrawal et al. | 370/253 |
| 5,675,793 A | 10/1997 | Crick et al. | |
| 5,758,057 A * | 5/1998 | Baba et al. | 714/7 |
| 6,952,739 B2 * | 10/2005 | Fritz et al. | 709/232 |
| 7,096,472 B2 * | 8/2006 | Machida et al. | 718/107 |
| 2003/0216155 A1* | 11/2003 | Kobayashi | 455/561 |
| 2003/0219014 A1* | 11/2003 | Kotabe et al. | 370/375 |

* cited by examiner

Primary Examiner—Alan Chen
Assistant Examiner—Kim Huynh (57) ABSTRACT

Interprocess buffer management is described. In an implementation, a method includes determining an amount of time to communicate a message and receive a response to the message by a first process from a second process. A buffer delay time is computed from the amount of time. Data from the first process is stored in a buffer. When the buffer delay time is reached, the buffer is sent to the second process.

40 Claims, 7 Drawing Sheets

INTERPROCESS BUFFER MANAGEMENT USING A BUFFER DELAY TIME

TECHNICAL FIELD

The present invention generally relates to the field of buffers and more particularly relates to interprocess buffer management.

BACKGROUND

A process may be thought of as an instance of the execution of a program by a client, or a service started by the operating system. For example, the process includes a sequence of states of the executing program, such as the program code, data, and the state of the processor(s) that are executing the program, e.g. values in registers of the processor. Thus, the process is a "running" program (either client program or a service) and a particular set of data that is associated with the program.

During execution of the process, the process may communicate information with another process, such as to exchange information, synchronize execution, and so on. Communication between processes is generally referred to as InterProcess communication (IPC). IPC includes a programming interface that may be utilized to communicate between a plurality of processes that are executed concurrently on the client or server computer. For instance, a plurality of processes may be utilized in the execution of a single program so that the program can handle a plurality of concurrent user requests. In another instance, a single user request may result in the concurrent execution of a plurality of processes. IPC is utilized to make this concurrent execution possible by providing for data communication between the processes.

During the concurrent execution of the plurality of processes, however, one of the processes may be executed more quickly than another one of the processes. If one of the processes sends data to another process, for instance, the receiving process should not impede the sender even if the receiving process is not ready to consume the data from the sending process. To optimize the communication between the processes, a buffer may be utilized. The buffer may be implemented as a storage area in memory that is shared by processes that are executed at different speeds, different priorities, and so on. The buffer, for instance, may allow each process to be executed without being dependent on another process.

When designing the buffer, the buffer designer may configure the size of the buffer and algorithms for moving data into and out of the buffer to optimize the functionality of the buffer. When configuring the buffer, the designer oftentimes is forced to make a "best guess" about the buffer sizes for communication between the processes. As previously stated, however, a wide variety of processes may be executed on the client to provide a wide variety of functionality. Therefore, the buffer designer may not have sufficient information regarding the contemplated usage patterns, required communication speed, comparative rates of generating logical messages and consuming those messages by the other process. Additionally, once the buffer is designed, the buffer is generally fixed in both size, e.g. amount of data that may be stored in the buffer, and by the algorithms that are utilized to control data flow using the buffer. Therefore, the buffer management algorithms may be designed for situations that are not similar to the actual situations that the buffer encounters during operation, which may decrease the usefulness of the buffer.

Therefore, there is a continuing need to improve techniques for interprocess buffer management using adaptive algorithms.

SUMMARY

Interprocess buffer size management, and sending delay management is described. An InterProcess Communication (IPC) manager is provided for managing buffer size and buffer delay times that are utilized to pass data between processes. The processes may include processes provided by separate programs or services. The described buffer management may be used for communication between processes on one machine, or processes running on different machines. The IPC manager may manage the buffer based on an amount of time utilized to communicate between the processes. The IPC manager is utilized to automatically control the size of the buffer, e.g. an amount of data that may be stored by the buffer, and hence communication delays between the processes. Each buffer may contain one or more logical messages. The buffer management achieves a balance between communications delays (requiring small buffers) and communication overhead (requiring bigger buffers and hence smaller number of transmissions).

In an implementation, a method includes determining an amount of time to communicate a message and receive a response to the message by a first process from a second process. A buffer delay time is computed from the amount of time. Data from the first process is stored in a buffer. When the buffer delay time is reached, the buffer is sent to the second process.

In another implementation, a system includes first and second processes, a buffer, a buffer delay time, and an IPC manager. The first process is for outputting data and the second process is for processing the data to produce a response. The buffer is for storing the data before transmission. The buffer delay time is computed from an amount of time taken to perform the outputting and to receive the response by the first process. The IPC manager is for managing the buffer such that when the buffer delay time is reached, other data stored in the buffer is accessible by the second process.

BRIEF DESCRIPTION OF THE DRAWINGS

The same reference numbers are utilized in instances in the discussion to reference like structures and components.

DETAILED DESCRIPTION

Overview

Interprocess buffer management is described. An InterProcess Communication (IPC) manager is provided for managing buffers that are utilized to pass data between processes. The processes may include processes within a single program, processes provided by separate programs, and/or processes that are executed on separate clients, i.e. across machine boundaries. The IPC manager may manage the buffer utilizing a buffer delay time that specifies a maximum amount of time data remains in the buffer before it is sent to another process. The IPC manager also provides for adaptive computation of this buffer delay time during which the unsent data remains in the sender's buffer. The IPC manager may also be utilized to automatically control the size of the buffer, e.g. an amount of data that may be stored by the buffer, and hence communication delays between the processes. In the following discussion, buffer size control may refer to management of memory used to keep partially-filled buffers.

In an implementation, the IPC manager manages the buffer based on an amount of time that is utilized to communicate between the processes that are utilizing the buffered communication. The IPC manager, for instance, may determine an amount of time to communicate a message and receive a response to the message. The amount of time may then be utilized to compute a buffer delay time which defines a maximum amount of time that data from the process is stored in the buffer before it is communicated to the other process.

The buffer delay time may balance divergent interests in communication between processes utilizing the buffer. For example, for each communication sent between processes there is an "overhead" of performing send-receive operations, and an even higher overhead of context switching (e.g., each send-receive operation may imply a context switch). The context switches may be especially expensive in some operating system implementations. To decrease this overhead, fewer communications that have a larger amount of data may be sent. By increasing the size of the communication, however, there may be an increased delay when waiting to obtain an amount of data to be sent that was requested. By computing a buffer delay time from the amount of time needed to send a message and receive a response to the message, the IPC manager may balance the response delay observed by the requestor and receiver of the message, channel throughput, and size of the allocated buffer to achieve a balance such that operation of the buffer may be optimized for the changing requirements of the processes that use the buffer.

Exemplary Environment

Figure 1:
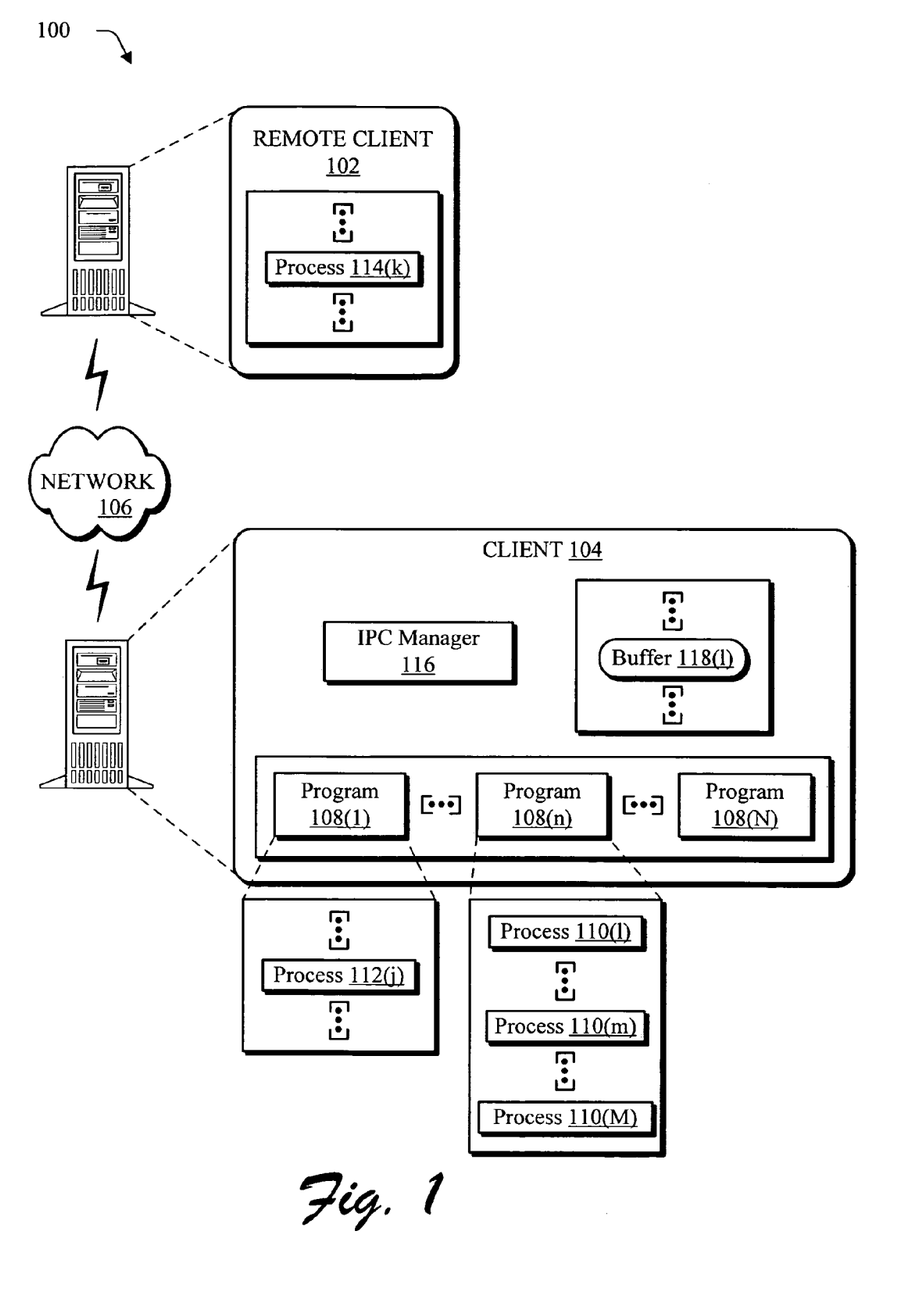
FIG. 1 is an illustration of an exemplary implementation showing an environment in which communication between a plurality of processes is performed utilizing a buffer managed by an InterProcess Communication (IPC) manager.

FIG. 1 is an illustration of an exemplary implementation showing an environment in which a plurality of processes communicates utilizing a buffer managed by an InterProcess Communication (IPC) manager. A remote client 102 is communicatively coupled to a client 104 over a network 106. The clients 102, 104 may be configured in a variety of ways. For example, the clients 102, 104 may be configured as computers that are capable of communicating over the network 106, such as a desktop computer, a mobile station, an entertainment appliance, a set-top box, a wireless phone, and so forth. The clients 102, 104 may range from a full resource device with substantial memory and processor resources (e.g., personal computers, television recorders equipped with hard disk) to a low-resource device with limited memory and/or processing resources (e.g., traditional set-top boxes). The client 104 may also relate to a person and/or entity that operate the client. In other words, client 104 may describe a logical client that includes a user and/or a machine.

The network 106 is illustrated as a wide area network (WAN). For example, the network 106 may also include a variety of networks that provide two-way communication, such as the Internet, an intranet, a wired or wireless telephone network, and so forth. The network 106 may also include a variety of local area networks (LANs), such as an Ethernet, wireless networks, and so forth.

The client 104 is illustrated as including a plurality of computer programs (programs) $108(l), \ldots, 108(n), \ldots, 108(N)$. Each of the plurality of programs $108(l)$-$108(N)$ is executable on the client 104 to provide one or more processes. For example, program $108(n)$ is illustrated as including a plurality of processes $110(l), \ldots, 110(m), \ldots, 110(M)$. As previously stated, the plurality of processes $110(l)$-$110(M)$ may be thought of as an instance of the execution of the program $108(n)$ by the client. For example, each of the processes $110(l)$-$110(M)$, when executed, includes a sequence of states of the executing program $108(n)$, such as the program code, data, and the state of the processor(s) that are executing the program.

During execution of the plurality of processes $110(l)$-$110$(M), one of the processes $110(l)$-$110$(M) may communicate with another one of the processes $110(l)$-$110$(M) through InterProcess Communication (IPC). As previously stated, IPC provides a set of programming interfaces that may be utilized to create and/or manage the plurality of processes $110(l)$-$110$(M) when executed concurrently on the client 104. One of more of the plurality of processes $110(l)$-$110$(M) of program $108(n)$ may also communicate with one or more other processes $112(j)$, where "j" is any integer between one and "J", that are executed from another program $108(l)$ another program. Further, one or more of the processes $110(l)$-$110$(M) may communicate with one or more of a plurality of processes $114(k)$, where "k" can be any integer between one and "K", that are executed on the remote client 102. Thus, IPC may be utilized to make this concurrent execution possible by providing for data to be communicated between the pluralities of processes $110(l)$-$110$(M), $112(j)$, $114(k)$.

The client 104 includes an IPC manager 116 which manages data flow utilizing one of more of the plurality of buffers $118(l)$, where "l" can be any integer from one to "L". The buffers $118(l)$ may be utilized to stored data from communication between processes $110(l)$-$110$(M) of a single program $108(n)$, between processes $110(l)$-$110$(M) of the program $108(n)$ and processes $112(j)$ of another program $108(l)$, and between processes $110(l)$-$110$(M) and processes $114(k)$ that are executed across "machine boundaries" on the remote client 102, which is described in greater detail in relation to FIG. 3.

The IPC manager 116, when executed on the client 104, dynamically controls data flow between the processes $110(l)$-$110$(M), $112(j)$, $114(k)$ by controlling the conditions at which the data is the buffers $118(l)$ is passed between the processes $110(l)$-$110$(M), $112(j)$, $114(k)$. For example, the IPC manager 116 may specify one or more conditions for sending a partially-filled buffer $118(l)$ from one process to another process. One such condition may include a buffer delay time that specifies a maximum amount of time that data from the process is sent to the other process. Therefore, the other process is not forced to wait for the contents of the buffer past the buffer delay time. The buffer delay time may be computed in a variety of ways, examples of which are discussed in relation to FIG. 4.

Figure 2:
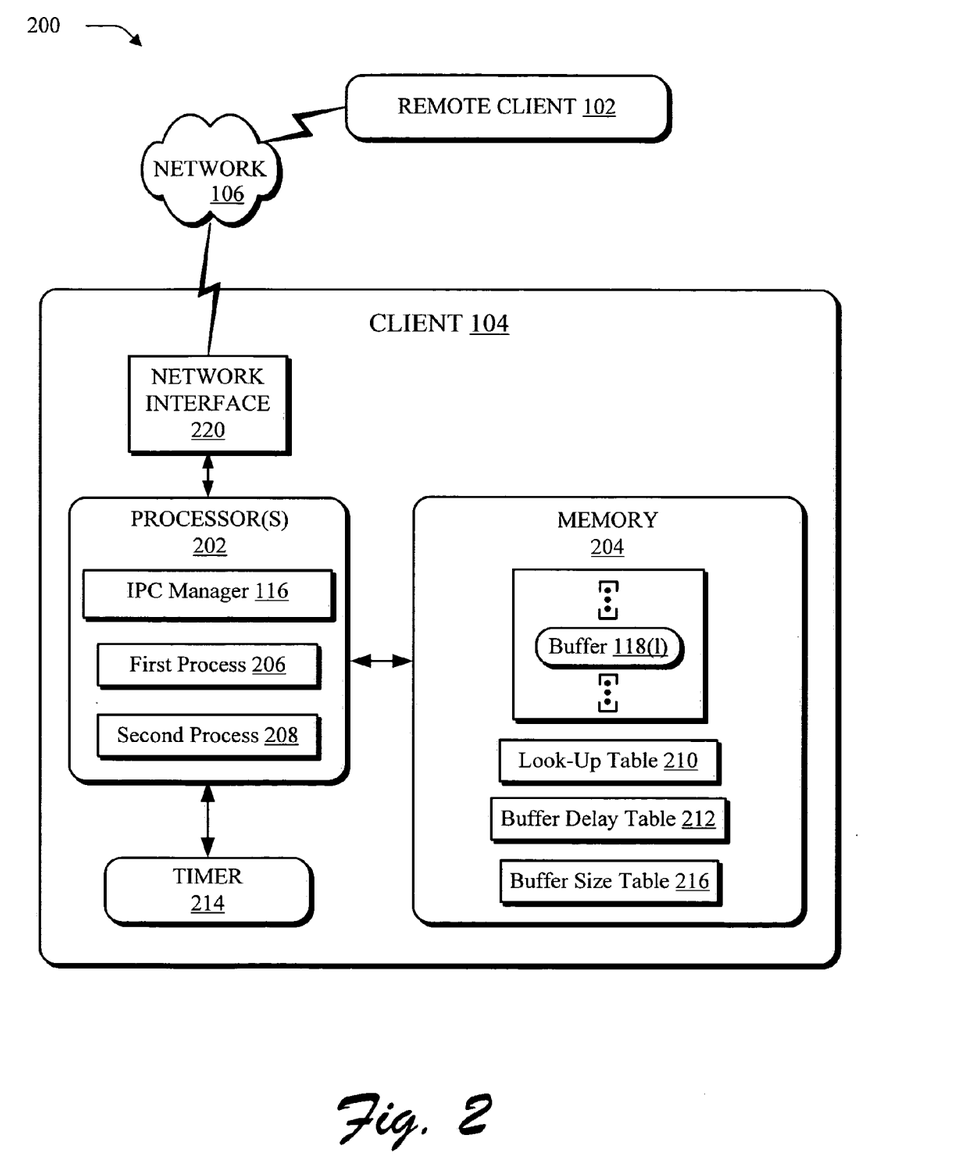
FIG. 2 is an illustration a system in an exemplary implementation showing the client of FIG. 1 in greater detail.

FIG. 2 is an illustration a system 200 in an exemplary implementation showing the client 104 of FIG. 1 in greater detail. The client 104 includes a processor 202 and memory 204. Although a single processor 202 is shown, the processor 202 may represent a plurality of processors. The IPC manager 116 is illustrated as being executed on the processor 202 and is storable in memory 204. The processor 202 is also illustrated as executing a first process 206 and a second process 208. Although the first and second processes 206, 208 are illustrated as both being executed on the processor 202, the first and second processes 206, 208 may respectively correspond to one or more of the processes 110(l)-110(M), 112(j), 114(k) of FIG. 1.

The memory 204 is illustrated as including the plurality of buffers 118(l). Although a single memory 204 is illustrated, memory 204 may represent a plurality of memories. For example, a first one of the plurality of buffers 118(l) may be included on a first memory and a second one of the plurality of buffers 118(l) may be included on a second memory. A look-up table 210 is also illustrated as being stored in memory 204. The look-up table 210 may include a plurality of entries which are utilized to map virtual memory addresses to physical memory addresses of the memory 204. For example, rather than provide an actual physical address of data in the memory 204, the data may be given a virtual address for processing by the first and/or second processes 206, 208. The look-up table 210 is utilized to convert the virtual address to the physical address to obtain and/or store the respective data.

A buffer delay table 212 is also illustrated as being stored in memory 204. The buffer delay table 212 may be utilized to store one or more buffer delay times that are computed by the IPC manager 116. In an implementation, the buffer delay table 212 represents storage of a single buffer delay time. The single buffer delay time in this implementation is the most recent buffer delay time computed by the IPC manager 116. In another implementation, the buffer delay table 212 includes a plurality of buffer delay times. For example, the buffer delay table 212 may include the last five buffer delay times computed by the IPC manager 116. The IPC manager 116 may then utilize the entries in the buffer delay table 212, along with a determination of an amount of time to send a message and receive a response to compute a new buffer delay time. Further discussion of the computation of a buffer delay time from past buffer delay times may be found in relation to FIG. 6.

The client 104 also includes a timer 214. The timer 214 may be implemented in hardware, software, or a combination thereof. The IPC manager 116, when executed on the client 104, may monitor the timer 214 to compute the amount of time taken to send a message and receive a response to the message, as well as to determine when to send the buffer 118(l) from one process to another. Further discussion of determining an amount of time to send a message and receive a response to the message utilizing the timer 214 may be found in relation to FIGS. 4 and 6. Further discussion of monitoring the timer 214 to determine when to send the buffer 118(l) from one process to another process may be found in relation to FIGS. 5 and 6.

The client 104 further includes a buffer size table 216. The buffer size table 216 may be utilized to store one or more entries that describe the size of data (e.g., an amount of memory utilized to store the data) communicated in the buffer 118(l). For example, the IPC manager 116, when executed on the client 104, may allocate the buffer 118(l) to store data communicated between processes having a size that correspond to the largest size of any of the "Z" entries stored in the buffer size table 216, where "Z" is the number of entries in the buffer size table 216. The buffer size table 216, for instance, may include five entries which respectively describe the five most recent buffer sizes that were communication. Thus, the size of the buffer 118(l) may be managed by the IPC manager 116 based on heuristic data, further discussion of which may be found in relation to FIG. 5.

Figure 3:
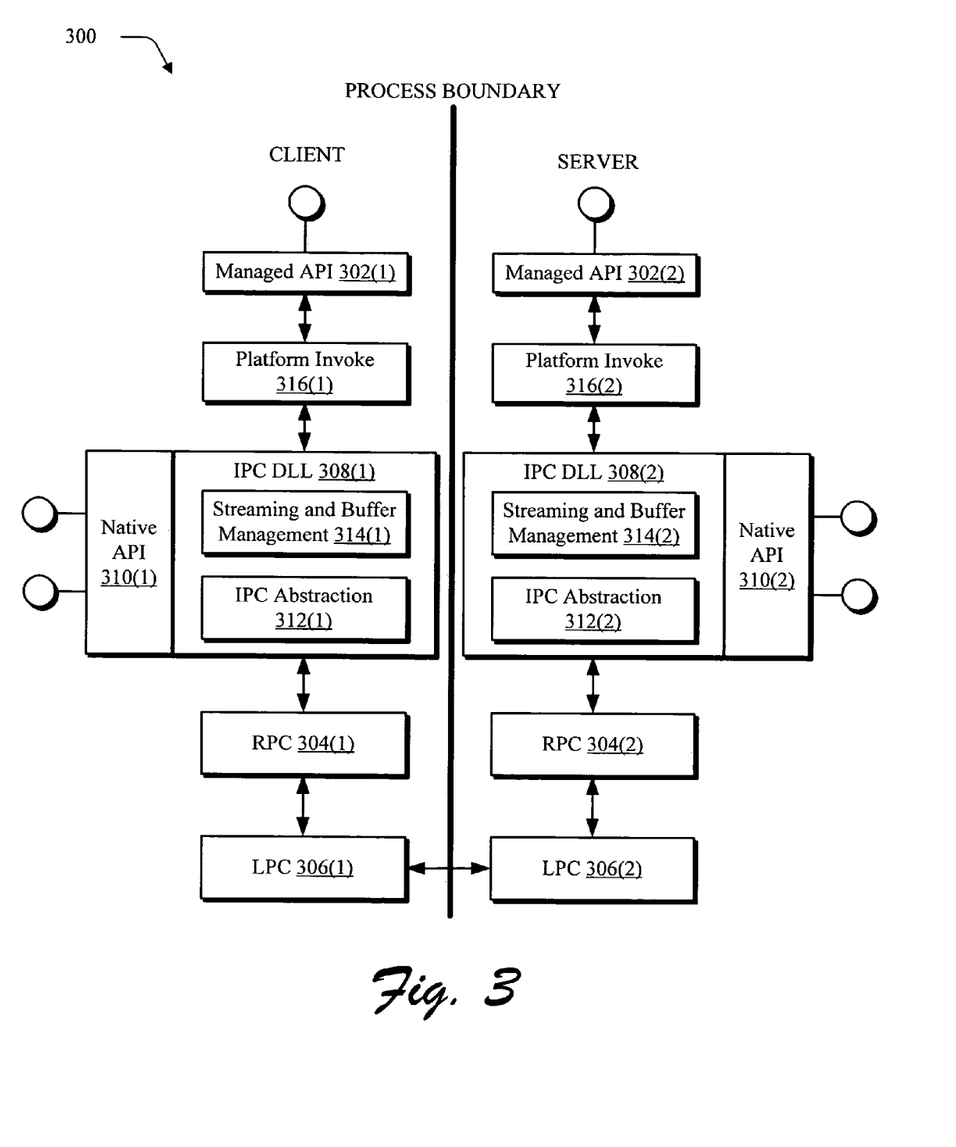
FIG. 3 is an illustration of an exemplary implementation of an IPC mechanism shown as a hierarchical arrangement of software components that may be utilized to provide IPC.

FIG. 3 is an illustration of an exemplary implementation of an IPC mechanism 300 shown as a hierarchical arrangement of software components that may be utilized to provide IPC. The IPC mechanism 300 provides a highly-abstracted managed code Application Programming Interfaces (APIs) 302(1), 302(2) with support of calls for cancellation (e.g., such that other processes may be made aware that processing of a message is no longer needed and/or desired by the requesting process), streaming, automatic communication, buffer size management, and integration with serialization functions. The IPC mechanism 300 may employ a subset of native Remote Procedure Call (RPC) 304(1), 304(2) over Local Procedure Call (LPC) 306(1), 306(2) and builds support for streaming, cancellation and buffer management on top of it. The IPC mechanism 300 includes native IPC Dynamic Link Libraries (DLLs) 308(1), 308(2) exposing respective native APIs 310(1), 310(2). The IPC mechanism may also employ the managed API 302(1), 302(2) to make the API available to managed applications.

The IPC mechanism 300 illustrates two levels of communication abstractions. The lower-level abstraction builds on the model of asymmetric channel, capable of delivering one-way messages or messages with responses. The low-level model defines commands for opening a server endpoint, connecting to the server endpoint, sending a message to an endpoint and sending a message with a response. There are additional commands for receiving asynchronous responses, canceling requests, removing endpoints and disconnecting from endpoints. In the illustrated IPC mechanism 300, an IPC 312(1), 312(2) keeps communication logic in native code. The communication logic may be minimized through careful selection of the communication abstraction.

The higher-level model adds a streaming and buffer management API 314(1), 314(2). In the current implementation, the IPC mechanism includes automatic management of the grouping of logical messages into network packets, as well as automatic management of network packet size. The algorithm used is adaptive in nature as previously described.

The IPC mechanism 300 also employs platform invoke 316(1), 316(2) for implementing the managed API 302(1), 302(2). The "Platform Invoke" is an interoperation mechanism that may be provided in a managed code implementation. This mechanism enables interaction of native (C or C++) code with managed code, such as .NET code, C#, and so on. Through use of platform invoke 316(1), 316(2), the cost of managed-to-native transition is reduced and thus overall efficiency of the IPC mechanism 300 is improved.

Exemplary Procedures

Figure 4:
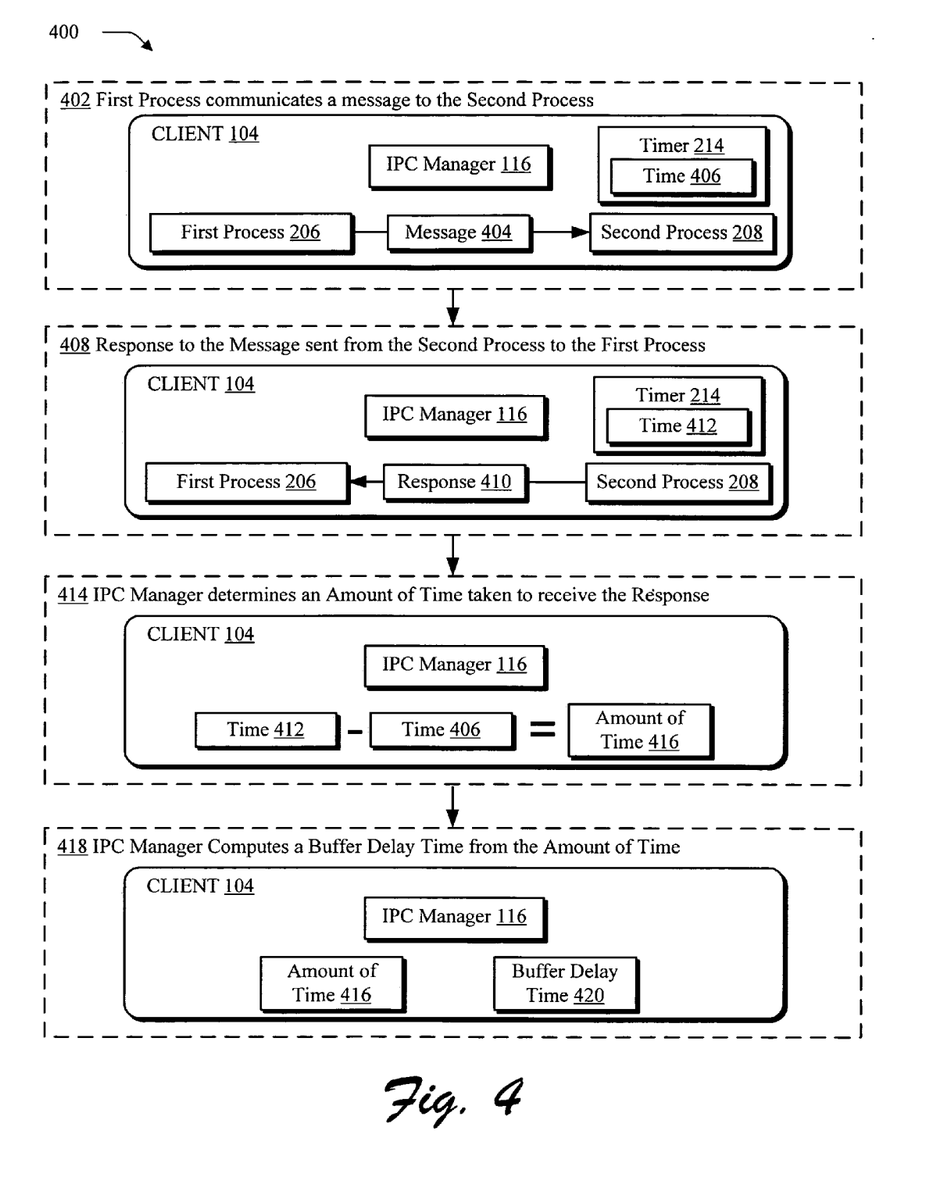
FIG. 4 is a flow diagram depicting a procedure in an exemplary implementation in which an amount of time used to communicate a message and receive a response to the message by a first process from a second process is utilized to compute a buffer delay time.

FIG. 4 is a flow diagram 400 depicting a procedure in an exemplary implementation in which an amount of time used to communicate a message and receive a response to the message by a first process from a second process is utilized to compute a buffer delay time. At block 402, a first process 206 communicates a message 404 to a second process 208. As previously stated, although the first and second processes 206, 208 are illustrated on the client 104, the first and second processes 206, 208 may be executed in a variety of ways. For example, the first and second processes 206, 208 may both correspond to a single application, the first process 206 may correspond to a first application and the second process 208 may correspond to a second application, the first process 206 may be executed on the client 104 and the second process 208 may be executed on the remote client 102 of FIG. 1, and so on.

The IPC manager 116 checks the timer 214 to determine when the message 404 was sent. For example, the IPC manager 116 may query the timer 214 to determine a time 406. In another example, the IPC manager 116 may initiate the timer 214 such that the time 406 starts when the message 404 is communicated.

At block 408, a response 410 to the message 404 communicated at block 402 is received by the first process 206 from the second process 208. The IPC manager 116 again checks the timer 214 to determine when the response 410 was received. For example, the IPC manager 116 may query the timer 214 to determine a time 412. In another example, the IPC manager 116 may also stop execution of the timer 214 that was initiated when the message 404 was communicated at block 402.

At block 414, the IPC manager 116 determines an amount of time 416 taken to communicate the message 404 and receive the response 410 to the message 404. The IPC manager 116, for instance, may subtract the time 406 queried at block 402 from the time 412 queried at block 408 to determine the amount of time 416. If the timer 214 was initiated by the IPC manager 116 when the message 404 was communicated, the time 412 is equal to the amount of time 416.

At block 418, the IPC manager 116 computes a buffer delay time 420 from the amount of time 416 determined at block 414. By utilizing the amount of time 416, the buffer delay time 420 is based on the execution of the first and second processes 206, 208 to form the message 404 and the response 410, respectively, as well as the amount of time utilized to communicate the message 404 and the response 410 between the first and second processes 206, 208. The buffer delay time 420 may therefore balance divergent interests in communication between the first and second processes 206, 208. For example, as previously described for each communication sent between processes there is an "overhead" of an amount of time needed to perform the communication. To decrease this overhead, fewer communications that have a larger amount of data may be sent. By increasing the size of the communication, however, there may be an increased delay when waiting to obtain a requested amount of data to be sent. By computing a buffer delay time from the amount of time needed to send a message and receive a response to the message, the IPC manager may balance the response delay observed by the requester and receiver of the message, channel throughput, and size of the allocated buffer to achieve a balance. In an implementation, the computed buffer delay time 420 is approximately equal to twice the amount of time 416.

Figure 5:
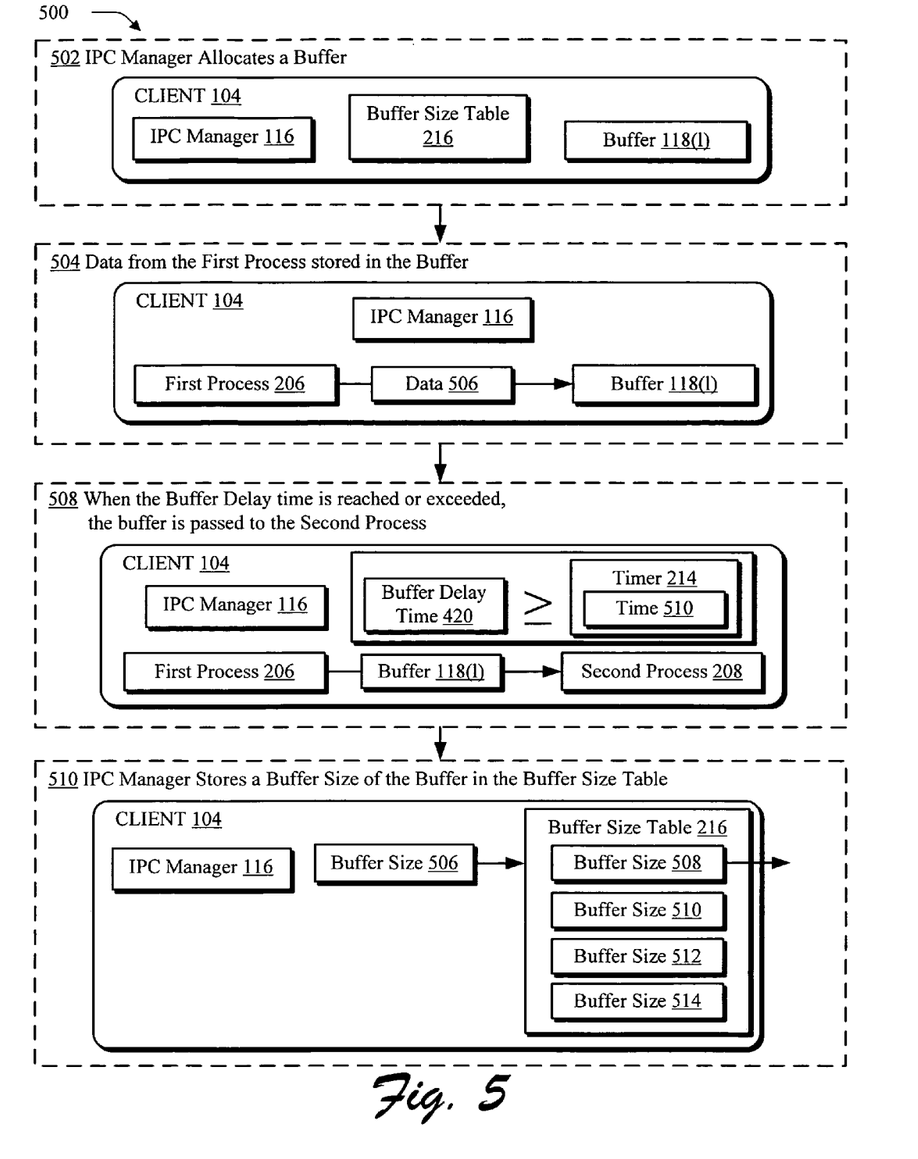
FIG. 5 is a flow diagram depicting a procedure in an exemplary implementation in which the buffer delay time computed in FIG. 4 is used to manage a buffer for communicating data between first and second processes.

FIG. 5 is a flow diagram depicting a procedure 500 in an exemplary implementation in which the buffer delay time computed in FIG. 4 is used to manage a buffer 118(*l*) for communicating data between first and second processes 206, 208. At block 502, the IPC manager 116 allocates a buffer 118(*l*). The buffer 118(*l*) may be allocated in a variety of ways. The IPC manager 116, for instance, may query the buffer size table 216. As previously described, the buffer size table 216 may include a plurality of entries that describe sizes of buffers, i.e. an amount of memory used, that were previously utilized to communicate between processes. In one example, the buffer size table 216 may be specific for buffer sizes that were previously utilized between particular processes. For instance, the buffer size table 216 may describe previous buffer sizes that were utilized by the first and second processes 206, 208. In another example, the buffer size table 216 may describe buffer sizes between any recently executed processes.

At block 504, data 506 from the first process 206 is stored in the buffer 118(*l*). For example, the data 506 may be streamed from the first process 206 for storage in the buffer 118(*l*). At block 508, when the buffer delay time 420 is reached or exceeded, the IPC manager 116 passes the buffer 118(*l*) to the second process 208. The IPC manager 116, for instance may monitor the timer to determine when the buffer delay time 420 is greater than or equal to the time 510 indicated by the timer 214.

When the buffer delay time 420 is reached or exceed, the buffer 118(*l*) may be passed between the first and second processes 206, 208 in a variety of ways. In the current implementation, the buffers are sent via RPC over LPC. In an example, the IPC manager 116 passes control of the buffer 118(*l*) from the first process 206 to the second process 208 by executing a "send" operation. Therefore, the data 506 in the buffer 118(*l*) is not communicated from the first process 206 to the second process 208, but rather the second process 208 gains control over the buffer 118(*l*) to obtain the data 506 from the buffer 118(*l*) itself. It should be noted that in some implementations of operating systems, actual movement of buffers is under operating system control. The RPC, which is the part of the operating system, may chose to either physically copy the buffer contents from server to receiver process, or keep the buffer in the shared memory so that the receiving process will gain access to buffer contents. In both cases, the interaction of the sender and the receiver is abstracted by send and receive operations. In another example, data 506 from the buffer 118(*l*) is communicated from the buffer 118(*l*) to the second process 208 when the buffer delay time 420 is reached or exceeded. The data 506, for instance, may be communicated from the buffer 118(*l*) to an address space in the memory, either virtual or actual, that is managed by the second process 208 such that the second process 208 may recognize the data 506 therein.

At block 510, the IPC manager 116 stores a buffer size 506 of the buffer 118(*l*) in the buffer size table 216. The buffer size table 216 is represented as including four entries that describe buffer size that were previously utilized by the IPC manager 116, which is represented pictorially in FIG. 5 as buffer size 508, 510, 512, 514. The IPC manager 116 may utilize a variety of techniques to determine which buffer entry to replace with a new buffer entry, e.g. buffer size 506. For example, the IPC manager 116 may include the largest buffer sizes in the buffer size table 216. Utilizing this technique, the size of the buffer 118(*l*) is maximized yet the amount of time that expires before the buffer is sent between processes still does not exceed the buffer delay time 420 as described in relation to block 508. Yet another technique is for the IPC manager 116 to include the smallest buffer sizes in the buffer size table 216. Utilizing this technique, the size of the buffer 118(*l*) is minimized such that the buffer is communicated between processes more quickly than if the buffer size was maximized. Therefore, the buffer 118(*l*) may be communicated between the first and second processes 206, 208 before the buffer delay time 420 is reached in most instances.

Figure 6:
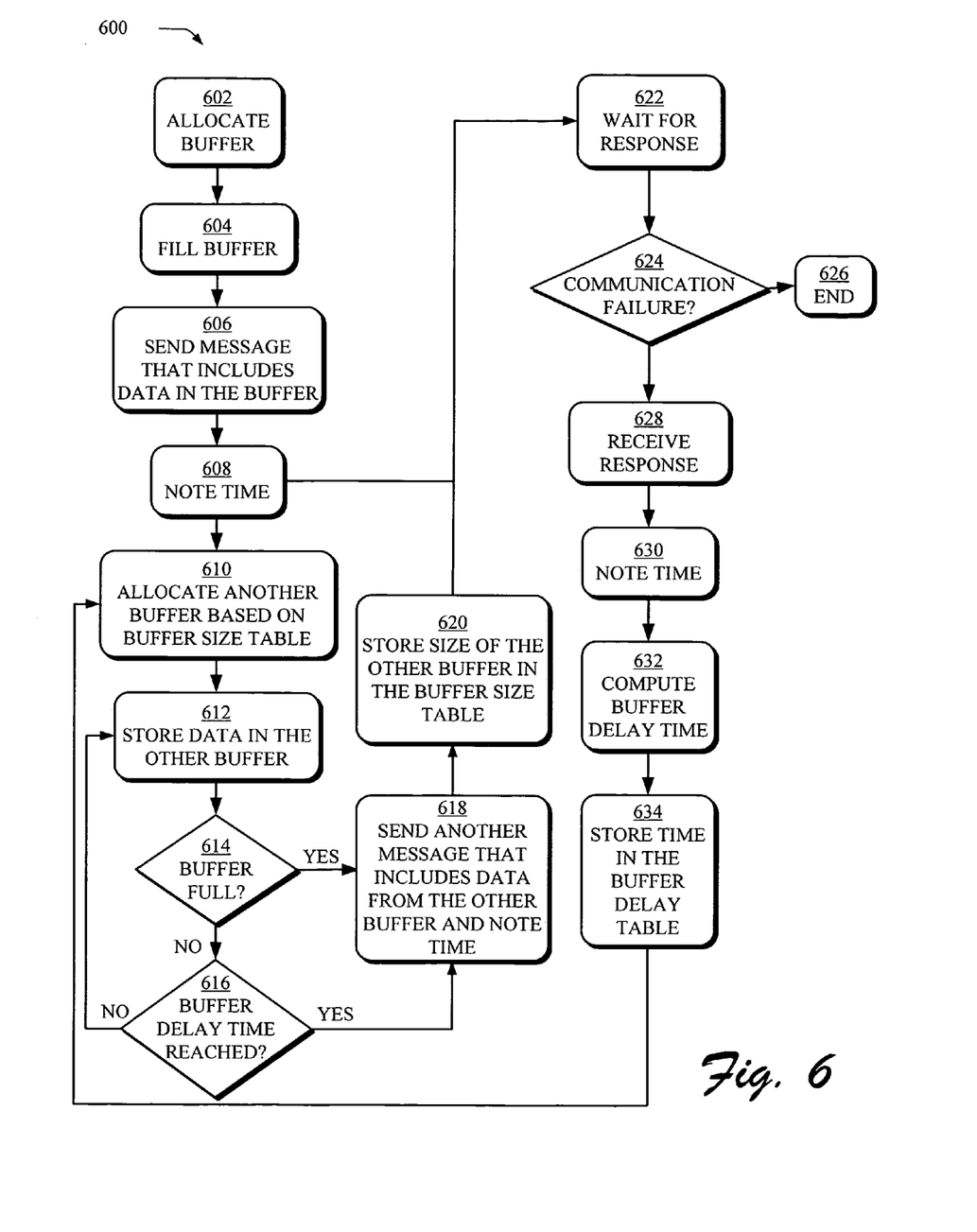
FIG. 6 is a flow diagram depicting a procedure in an exemplary implementation in which the buffer delay time, the buffer size table, and a buffer delay table are used by the IPC manager to manage a buffer for communicating data between processes.

FIG. 6 is a flow diagram depicting a procedure 600 in an exemplary implementation in which the buffer delay time, the buffer size table, and a buffer delay table are used by the IPC manager to manage a buffer for communicating data between processes. At block 602, a buffer is allocated by the IPC manager. At block 604, a first process 604 fills the allocated buffer, after which, a message is sent that includes data in the buffer (block 606). As previously described, "sending" the buffer may include passing control of the buffer from one process to another, communicating the contents of the buffer, and so on. At block 608, the IPC manager notes the time the message was sent. For example, the IPC manager may query the timer 214 of FIG. 2, initiate operation of the timer 214, and so forth.

At block 610, the IPC manager allocates another buffer based on the buffer size table. At block 612, data is stored in the other buffer. At decision block 614, the IPC manager determines whether the other buffer is full. If not, then at decision block 616 the IPC manager determines whether the buffer delay time is reached. If the buffer is full at decision block 614 or the buffer delay time was reached at block 616, then at block 618 another message is sent that includes data from the other buffer and another time is noted. At block 620, the IPC manager stores the size of the other buffer in the buffer size table.

At block 622, the IPC manager waits for a response to the message sent at block 606 and/or the message sent at block 618. Block 622 may be performed by the IPC manager in parallel with the performance of blocks 610-622. For example, the IPC manager, after noting the time at block 608, waits for a response at block 622 while allocating the other buffer (block 610), storing data in the buffer (block 612), performing the determinations (blocks 614, 616), sending the other message (block 618), and storing the size of the other buffer (block 620). Thus, the IPC manager in this implementation continues to manage data storage from processes while waiting for the response.

At block 624, the IPC manager determines if there has been a communication failure between the processes. The IPC manager, for instance, may specify a maximum period of time to wait for the response. If that maximum time has been reached, then the procedure 600 ends at block 626 for that particular message. The procedure 600, however, may continue by sending a failure message and resending the message from block 606.

At block 628, the IPC manager receives a response to the message that was sent at block 606. When the response is received, the IPC manager notes the time at block 630. At block 632, the IPC manager computes a buffer delay time from the times noted at blocks 608, 630, respectively. The IPC manager, for instance computes the buffer delay time by doubling the amount of time it took to send the message at block 606, processes the message by the second process, and to receive a response to the message at block 628.

At block 634, the IPC manager stores the buffer delay time as an entry in the buffer delay table. In an implementation, the IPC manager stores a plurality of buffer delay times in the buffer delay table and then utilizes buffer delay table to compute a new buffer size for managing the next allocated buffer (block 610). By computing the new buffer delay time from a plurality of previously utilized buffer delay times, the new buffer delay time may "round-out" one or more buffer delay time anomalies. For example, due to a communication interruption the most recently computed buffer delay time may have a much higher than previous buffer delay times that were utilized by the IPC manager. Therefore, the IPC manager may utilize the plurality of entries in the buffer delay table to reduce the effect of this anomaly, such as by increasing the buffer size. In another example, the buffer delay table is not utilized, but rather just the most recently computed buffer delay time is utilized. Thus, the procedure 600 may repeat block 610-634 such that the buffer delay time may change due to changing operational conditions of an environment that executes the procedure 600, such as the amount of time taken to send the message, processes the message, and/or receive the response.

Exemplary Operating Environment

Figure 7:
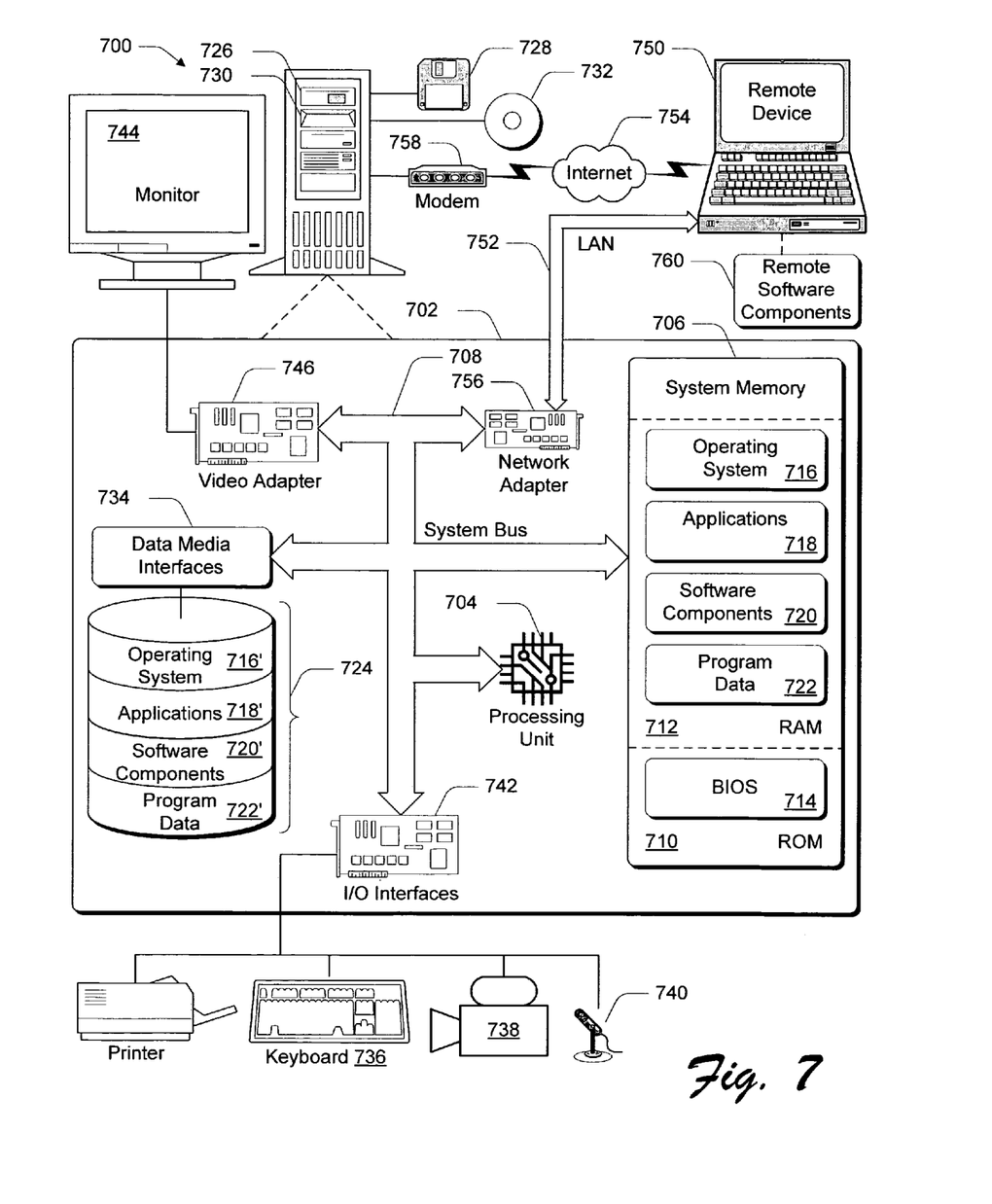
FIG. 7 is an illustration of an exemplary operating environment.

The various components and functionality described herein are implemented with a number of individual computers. FIG. 7 shows components of a typical example of a computer environment 700, including a computer, referred by to reference numeral 702. The computer 702 may be the same as or different from client 104 of FIG. 2. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, and so on, that perform particular tasks or implement particular abstract data types. Tasks might also be performed by remote processing devices that are linked through a communications network. In a distributed computing environment, software components may be located in both local and remote computer storage media as previously described in relation to FIG. 3.

The instructions and/or software components are stored at different times in the various computer-readable media that are either part of the computer or that can be read by the computer. Programs are typically distributed, for example, on floppy disks, CD-DVD, ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 702 may include, but are not limited to, a processing unit 704, a system memory 706, and a system bus 708 that couples various system components including the system memory to the processing unit 704. The system bus 708 may be any of several types of bus structures including a memory bus or memory controller, a peripheral bus, and a local bus using any of a variety of bus architectures.

Computer 702 typically includes a variety of computer-readable media. Computer-readable media can be any available media that can be accessed by computer 702 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video discs (DVD) or other optical disk storage, magnetic cassettes, magnetic tape, magnetic disk storage or other magnetic storage devices, or any other medium which can be used to store the desired information and which can be accessed by computer 702. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 702, such as during start-up, is typically stored in ROM 710. RAM 712 typically contains data and/or software components that are immediately accessible to and/or presently being operated on by processing unit 704. By way of example, and not limitation, FIG. 7 illustrates operating system 716, applications 718, software components 720, and program data 722. The program data 722 may include data which is stored in a buffer allocated in the system memory 706 for communication between processes being executed on the processing unit 704. Thus, the program data 722 may or may not include processes 110($l$)-110(M) and 112($j$) of FIG. 1 and the first and second processes 206, 208 of FIG. 2.

The computer 702 may also include other removable/non-removable, volatile/nonvolatile computer storage media. By way of example only, FIG. 7 illustrates a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, software components, and other data for computer 702. In FIG. 7, for example, hard disk drive 724 is illustrated as storing operating system 716', applications 718', software components 720', and program data 722'. Note that these components can either be the same as or different from operating system 716, applications 718, software components 720, and program data 722. Operating system 716', applications 718', software components 720', and program data 722' are given different numbers here to illustrate that, at a minimum, they are different copies. A user may enter commands and information into the computer 702 through input devices such as a keyboard 736, and pointing device (not shown), commonly referred to as a mouse, trackball, or touch pad. Other input devices may include source devices (such as a microphone 738 or camera 740 which provide streaming data), joystick, game pad, satellite dish, scanner, or the like. These and other input devices are often connected to the processing unit 702 through an input/output (I/O) interface 742 that is coupled to the system bus, but may be connected by other interface and bus structures, such as a parallel port, game port, or a universal serial bus (USB). A monitor 744 or other type of display device is also connected to the system bus 708 via an interface, such as a video adapter 746. In addition to the monitor 744, computers may also include other rendering devices (e.g., speakers) and one or more printers, which may be connected through the I/O interface 742.

The computer may operate in a networked environment using logical connections to one or more remote computers, such as a remote device 750. The remote device 750 may be the same as or different from the remote client 102 of FIG. 1. The remote device 750 may be a personal computer, a network-ready device, a server, a router, a network PC, a peer device or other common network node, and typically includes many or all of the elements described above relative to computer 702. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 702 is connected to the LAN 752 through a network interface or adapter 756. When used in a WAN networking environment, the computer 702 typically includes a modem 758 or other means for establishing communications over the Internet 754. The modem 758, which may be internal or external, may be connected to the system bus 708 via the I/O interface 742, or other appropriate mechanism. In a networked environment, program modules depicted relative to the computer 702, or portions thereof, may be stored in the remote device 750. By way of example, and not limitation, FIG. 7 illustrates remote software components 760 as residing on remote device 750. It will be appreciated that the network connections shown are exemplary and other means of establishing a communications link between the computers may be used.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   determining an amount of time to communicate an interprocess message and receive a response to the interprocess message by a first process respectively to and from a second process;
   computing a buffer delay time from the amount of time;
   storing data from the first process in a buffer; and when the buffer delay time is reached, making the data in the buffer available to the second process by passing control of the buffer to the second process without communicating the data by the first process.

2. The method as described in claim 1, further comprising when the buffer is full, sending the buffer to the second process, otherwise, when the buffer delay time is reached, making the data in the buffer available to the second process by passing control of the buffer to the second process without communicating the data by the first process.

3. The method as described in claim 1, wherein determining includes:
forming a communication to send the interprocess message from the first process to the second process;
receiving the response to the interprocess message by the first process from the second process; and
monitoring a timer in relation to the communicating and the receiving to determine the amount of time.

4. The method as described in claim 1, wherein the buffer delay time is computed to be double the amount of time.

5. The method as described in claim 1, further comprising allocating the buffer using a buffer size table, wherein:
the buffer size table has a plurality of entries;
the buffer is allocated based on the plurality of entries; and
each said entry describes an amount of another buffer used to store data from the first process.

6. The method as described in claim 1, wherein the first and second processes are respective running programs that communicate, one to another.

7. The method as described in claim 1, wherein the first and second processes are respective running programs having one or more corresponding sets of data that are associated with respective first and second applications.

8. The method as described in claim 1, wherein:
the first and second processes are running programs that are executed on respective first and second clients; and
the first client is communicatively coupled to the second client over a network.

9. The method as described in claim 1, wherein the sending includes passing control over the data in the buffer from the first process to the second process by the first process by using a send operation.

10. The method as described in claim 1, wherein the making includes communicating the stored data within the buffer to the second process.

11. One or more computer readable-media comprising computer executable instructions that, when executed on a computer, direct the computer to perform the method of claim 1.

12. A method comprising:
sending a message from a first process addressed to a second process which is separate from the first process;
receiving, at the first process, a response to the message sent from the second process to the first process;
computing a buffer delay time as a factor of the time between the communicating and the receiving; and
making data from the first process that is stored in the buffer available to the second process when the buffer delay time is reached by passing control of the buffer from the first process to the second process without communicating the data by the first process.

13. The method as described in claim 12, wherein when the buffer delay time has not been reached and the buffer is full, sending the buffer to the second process.

14. The method as described in claim 12, wherein the buffer delay time is computed to be double a time taken between the communicating and the receiving.

15. The method as described in claim 12, further comprising during the receiving, storing additional data from the first process in a second said buffer.

16. The method as described in claim 12, further comprising allocating the buffer using a buffer size table, wherein:
the buffer size table has a plurality of entries;
the buffer is allocated based on the plurality of entries; and
each said entry describes an amount of the memory of another buffer that was used to store data from the first process.

17. The method as described in claim 12, wherein the first and second processes are at least one of:
executions of respective first and second applications; and
executed on respective first and second clients, wherein the first client is communicatively coupled to the second client over a network.

18. The method as described in claim 12, wherein the data stored in the buffer is available to the second process by passing control of the buffer from the first process to the second process without communicating the data by the first process by executing a send operation.

19. The method as described in claim 12, wherein the data stored in the buffer is available to the second process by communicating the stored data from the buffer to the second process.

20. One or more computer readable-media comprising computer executable instructions that, when executed on a computer, direct the computer to perform the method of claim 12.

21. A client comprising:
a processor; and
memory configured to maintain:
one or more programs that are executable on the processor to provide respective one or more processes to process data;
a buffer that is suitable to store said data;
a buffer delay time; and
an InterProcess Control (IPC) manager that is executable on the processor to:
compute the buffer delay time from an amount of time taken to receive a response to a message by one said process from another said process; and
manage the buffer such that when the buffer delay time is reached, data stored in the buffer from the one said process is made available to the other said process by passing control of the buffer from the one said process to the other said process without communicating the data by the one said process.

22. The client as described in claim 21, further comprising a timer for calculating the amount of time.

23. The client as described in claim 21, wherein the IPC manager is executable in native code to perform the computing and the managing.

24. The client as described in claim 21, wherein the IPC manager manages the buffer such that when the buffer is full, the buffer is sent to the other said process, otherwise when the buffer delay time is reached, the data stored in the buffer from the one said process is made available to the other said process by passing control.

25. The client as described in claim 21, wherein the buffer delay time is computed to be double the amount of time.

26. The client as described in claim 21, wherein the data stored in the buffer is made available by passing control of the buffer from the one said process to the other said process without communicating the data by the one said process by executing a send operation.

27. The client as described in claim 21, further comprising a buffer size table having a plurality of entries, each said entry describing an amount of the memory used to store data previously output by the one said process, wherein the IPC manager allocates the buffer based on the plurality of entries.

28. The client as described in claim 21, further comprising a buffer delay table having a plurality of entries, each said entry describing a buffer delay time that was previously computed by the IPC manager, wherein the IPC manager computes the buffer delay time from the amount of time and the previously computed buffer delay times.

29. The client as described in claim 21, wherein the IPC manager is executable to cancel the processing performed by the second process in response to a communication from the first process.

30. A system comprising:
   a first process for outputting data;
   a second process for processing the data to produce a response;
   a buffer for storing the data that is shared by the first process and the second process the first and second processes being external to the buffer;
   a buffer delay time computed from an amount of time taken to perform the outputting and to receive the response by the first process; and
   an interprocess communication (IPC) manager for managing the buffer such that when the buffer delay time is reached, another said data stored in the buffer is accessible by the second process.

31. The system as described in claim 30, further comprising a timer for calculating the amount of time.

32. The system as described in claim 30, wherein the IPC manager is executable in native code.

33. The system as described in claim 30, wherein the IPC manager manages the buffer such that when the buffer is full, the buffer is sent to the second process, otherwise when the buffer delay time is reached, another said data stored in the buffer is accessible by the second process.

34. The system as described in claim 30, wherein the IPC manager supports cancellation of the processing performed by the second process in response to a communication received from the first process.

35. The system as described in claim 30, wherein the buffer delay time is computed to be double the amount of time.

36. The system as described in claim 30, further comprising a buffer size table having a plurality of entries, each said entry describing an amount of the memory used to store data previously output by the first process, wherein the IPC manager allocates the buffer based on the plurality of entries.

37. The system as described in claim 30, further comprising a buffer delay table having a plurality of entries, each said entry describing a buffer delay time that was previously computed by the IPC manager, wherein the IPC manager computes the buffer delay time from the amount of time and the previously computed buffer delay times.

38. A system comprising:
   means for providing data;
   means for processing the data to produce a response for receipt by the providing means;
   means for storing the data;
   means for computing a delay time that is double an amount of time taken to perform the outputting and to receive the response by the providing means; and
   means for managing the storing means such that when the delay time is reached, another said data stored in the storing means is accessible by the processing means.

39. The system as described in claim 38, wherein the providing means and the processing means are executable on a single client.

40. The system as described in claim 38, wherein the providing means is executable on a client and the processing means is executable on a remote client that is communicatively coupled to the client over a network.

\* \* \* \* \*